(12) United States Patent
Karpman et al.

(10) Patent No.: US 12,321,831 B1
(45) Date of Patent: Jun. 3, 2025

(54) AUTOMATED DETECTION OF CONTENT GENERATED BY ARTIFICIAL INTELLIGENCE

(71) Applicant: Castle Global, Inc., San Francisco, CA (US)

(72) Inventors: Dmitriy Karpman, San Francisco, CA (US); Ryan Weber, San Francisco, CA (US); Kevin Guo, San Francisco, CA (US)

(73) Assignee: Castle Global, Inc., San Francisco, CA (US)

( * ) Notice: Subject to any disclaimer, the term of this patent is extended or adjusted under 35 U.S.C. 154(b) by 0 days.

(21) Appl. No.: 18/358,823

(22) Filed: Jul. 25, 2023

(51) Int. Cl.
  *G06N 20/00* (2019.01)
  *G06N 5/04* (2023.01)
(52) U.S. Cl.
  CPC .............. *G06N 20/00* (2019.01); *G06N 5/04* (2013.01)
(58) Field of Classification Search
  CPC ................................ G06N 20/00; G06N 5/04
  See application file for complete search history.

(56) References Cited

U.S. PATENT DOCUMENTS

2023/0306307 A1* 9/2023 Ulasen .................... G06N 20/00 706/12

OTHER PUBLICATIONS

Gehrmann, Sebastian, Hendrik Strobelt, and Alexander M. Rush. "Gltr: Statistical detection and visualization of generated text." arXiv preprint arXiv:1906.04043 (2019). (Year: 2019).*

Strobelt et al. "GLTR: Giant Language model Test Room", https://github.com/HendrikStrobelt/detecting-fake-text, May 14, 2023. (Year: 2023).*
Saravani, Sina Mahdipour, Indrajit Ray, and Indrakshi Ray. "Automated identification of social media bots using deepfake text detection." International Conference on Information Systems Security. Cham: Springer International Publishing, 2021. (Year: 2021).*
Mandelbaum, Amit, and Daphna Weinshall. "Distance-based confidence score for neural network classifiers." arXiv preprint arXiv:1709.09844 (2017). (Year: 2017).*
Zhou, Yipin, and Ser-Nam Lim. "Joint audio-visual deepfake detection." Proceedings of the IEEE/CVF International Conference on Computer Vision. 2021. (Year: 2021).*
Bird, Jordan J., and Ahmad Lotfi. "CIFAKE: Image Classification and Explainable Identification of AI-Generated Synthetic Images." arXiv preprint arXiv:2303.14126 (2023). (Year: 2023).*
Baek, Jae-Yong, Yong-Sang Yoo, and Seung-Hwan Bae. "Generative adversarial ensemble learning for face forensics." Ieee Access 8 (2020): 45421-45431. (Year: 2020).*

(Continued)

*Primary Examiner* — Michael J Huntley
*Assistant Examiner* — Sehwan Kim
(74) *Attorney, Agent, or Firm* — Kwan & Olynick LLP

(57) ABSTRACT

In some embodiments, at a first time, a computing system receives a classification request specifying query content. The system executes a first pre-trained AI-generated content classifier in the set of AI-generated content classifiers on the query content to compute a set of confidence scores proportional to predicted probabilities that the query content includes content data produced by a generative AI model. The set of confidence scores is generated based on parameters learned by the first pre-trained AI-generated content classifier during a training stage. The classification results are output based on the set of confidence scores at approximately the first time.

22 Claims, 7 Drawing Sheets

(56) References Cited

OTHER PUBLICATIONS

Rana, Md Shohel, and Andrew H. Sung. "Deepfakestack: A deep ensemble-based learning technique for deepfake detection." 2020 7th IEEE CSCloud/2020 6th IEEE international conference on edge computing and scalable cloud (EdgeCom). IEEE, 2020 (Year: 2020).*

Han, Xu, Xiaohui Chen, and Li-Ping Liu. "Gan ensemble for anomaly detection." Proceedings of the AAAI Conference on Artificial Intelligence. vol. 35. No. 5. 2021. (Year: 2021).*

Soleymanzadeh, Raha, and Rasha Kashef. "Efficient intrusion detection using multi-player generative adversarial networks (GANs): an ensemble-based deep learning architecture." Neural Computing and Applications 35.17 (2023): 12545-12563. (Year: 2023).*

Rao, Sanjeev, et al. "Deepfake Creation and Detection using Ensemble Deep Learning Models." Proceedings of the 2022 Fourteenth International Conference on Contemporary Computing. 2022. (Year: 2022).*

Radford, Alec, et al. "Language models are unsupervised multitask learners." OpenAI blog 1.8 (2019): 9. (Year: 2019).*

Ricker J, Damm S, Holz T, Fischer A. Towards the detection of diffusion model deepfakes. arXiv preprint arXiv:2210. 14571. Oct. 26, 2022. (Year: 2022).*

\* cited by examiner

AUTOMATED DETECTION OF CONTENT GENERATED BY ARTIFICIAL INTELLIGENCE

TECHNICAL FIELD

The present disclosure relates generally to the field of artificial intelligence and more specifically to new and useful systems and methods for automatically and accurately identifying content generated by artificial intelligence models.

BACKGROUND

In recent years, rapid advances in artificial intelligence ("AI") have made it possible to generate compelling image, audio, text, and video content with very little cost and human input. Transformer-based large language models can understand queries with semantic nuance and rapidly generate responsive text—including essays, documents, poetry, and computer code—that matches or surpasses average human capability. Similarly, diffusion models have proven remarkably capable of synthesizing visually appealing, photorealistic images and video based on natural language descriptions. Such models can also assist users in quickly editing and manipulating content based on natural language requests without knowledge of specialized editing software.

While these transformer-based deep learning models show great potential to automate creative and knowledge-based based work, the low cost of and ease of access to these services also creates significant risks of misuse. For example, educational institutions and employers increasingly report unattributed use of large language models to generate work product, whereby users shortcut normal processes or attempt to pass off model outputs as their own. Large language models can also be employed to generate more sophisticated phishing and spam communications at scale. Similarly, diffusion models enable bad actors to spread convincing misinformation by generating seamlessly manipulated images, video, and audio content at little to no cost. More generally, broad public access to generative models creates significant content moderation difficulties for content publishers and social platforms whose content policies prohibit or restrict AI-generated content. And while transformer-based generative models are relatively new, it is already difficult—if not impossible—for humans to accurately distinguish between certain types of AI-generated content and content created by humans with conventional tools

DETAILED DESCRIPTION OF THE EMBODIMENTS

Figure 1:
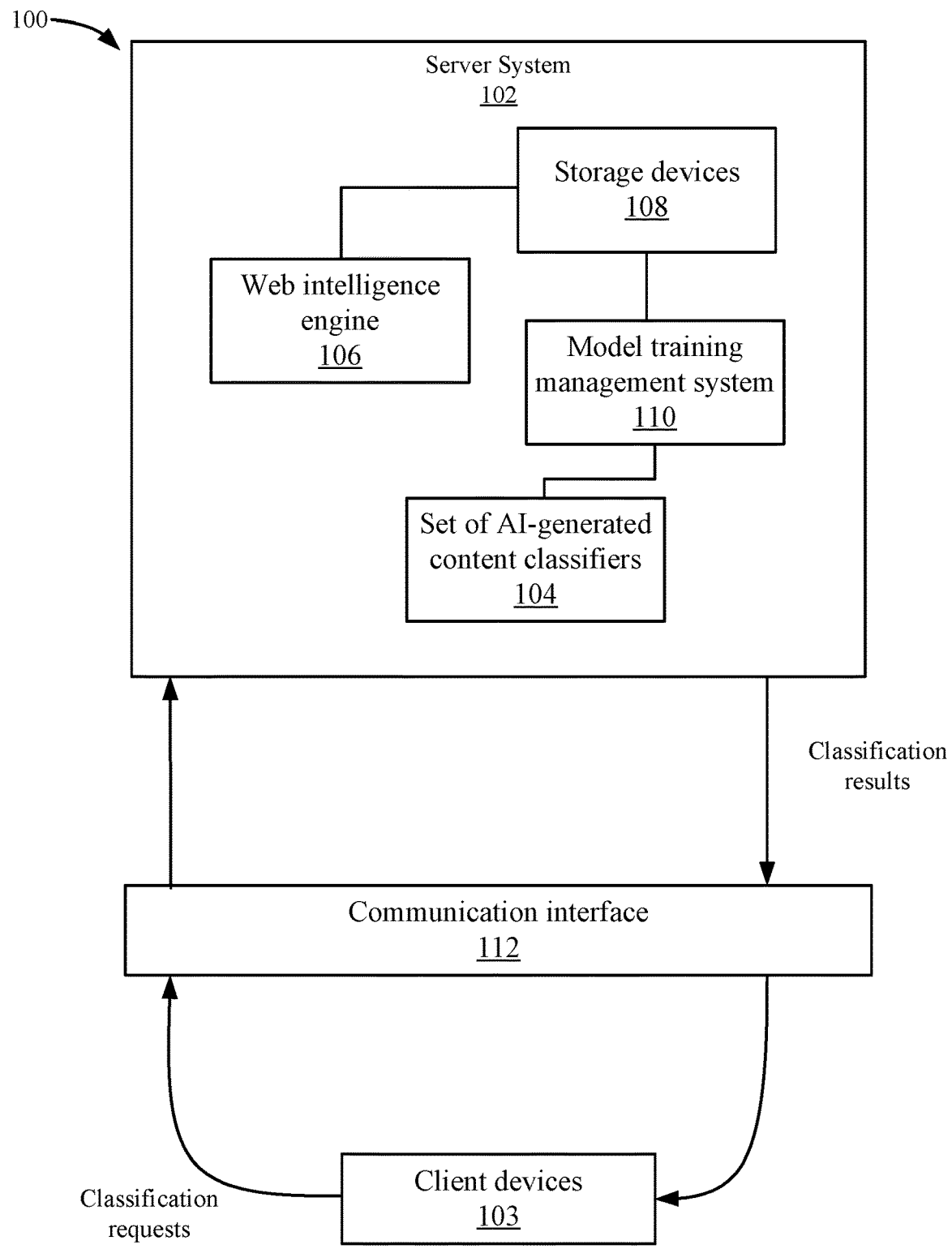
FIG. 1 depicts a simplified system for identifying generative content according to some embodiments.

The following description of embodiments is not intended to limit the disclosure to these embodiments, but rather to enable a person skilled in the art to make and use the embodiments. Variations, configurations, implementations, example implementations, and examples described herein are optional and/or interchangeable and are not exclusive and/or limited to the variations, configurations, implementations, example implementations, and examples they describe. The disclosure described herein can include or define any and all permutations of these variations, configurations, implementations, example implementations, and examples.

1. Summary and Applications

As transformer-based generative models become more sophisticated and more widely used across new and existing contexts, a system for a rapid, highly accurate, and low-cost method of automatically identifying AI-generated content is provided. The present disclosure describes an automated, on-demand service for detecting AI-generated content (i.e., text, images, audio and/or videos) using pre-trained deep learning models. The service and its variations can be implemented by a local, distributed, and/or cloud-based computing system to train and deploy highly accurate deep learning classifiers to identify documents, writing, images, and videos that were wholly or partly generated by generative models, such as large language or diffusion models. In some embodiments, classifiers may be used for different categories of input. For example, the computing system may identify a type of input and use a corresponding classifier for the type. The use of specialized classifiers may improve the results because AI-generated content may have different nuances depending on the type of content that specialized classifiers can detect.

Once trained, the computing system can leverage these AI-generated text, image, and video classifiers to generate and output classification results on query content submitted by users in near-real-time (i.e., within seconds).

More specifically, the computing system can source, produce, and store large, diverse sets of text, image, audio and video data-including both human-created and AI-generated content-used to train this set of AI-generated content classifiers. According to techniques described herein, the computing system can also introduce augmentations to the training data that mimic techniques (e.g., edits, manipulations) commonly used to modify, refine, repurpose or disguise AI-generated content. By analyzing this training data according to deep learning techniques described herein, these classifiers can automatically learn features that distinguish AI-generated text, image, audio and video content from human-created (or human-edited) analogues, including features that may be non-obvious to or even imperceivable by humans (e.g., pixel patterns or other artifacts leftover from diffusion processes). During operation, each AI-generated content classifier can therefore predict (i.e., compute, infer, or derive) highly accurate probabilities that new query content submitted by users was fully or partly produced by generative models. These AI-generated content classifiers can be further configured to output more detailed classification results, such as sentence-by-sentence or paragraph-by-paragraph level analysis of written documents or by identifying which specific generative model produced the query content.

The classifiers may also be multi-head classifiers that are configured to differentiate between outputs of several different generative models or services. More specifically, each multi-headed classifier defines a set of sub-classifiers, each of which are separately trained on content created by a single generative model in order to learn, infer, or derive features (e.g., linguistic choices, syntax, pixel patterns) that are specialized and/or unique to that particular model. Each sub-classifier (or "model head") can therefore (independently) output a confidence score proportional to a computed probability that query content was created by a particular generative model represented by the class. The outputs of the multi-head classifiers may be analyzed and combined into an overall confidence score. The use of multi-head classifiers may provide additional insight into the output because the classifier that is used may be helpful for users when analyzing the input. Also, the multi-head classifiers may improve the overall score. For example, the multi-head scores may be weighted based on the importance or relevance of different generative models to the input. Then, the overall score is computed based on the weighted multi-head scores.

2. System

FIG. 1 depicts a simplified computing system 100 for identifying generative content according to some embodiments. Computing system 100 includes a server system 102 and client devices 103. Server system 102 generally includes: processors and memory resources storing computer-executable instructions that define a set of AI-generated content classifiers 104, a web intelligence engine 106, and a set of storage devices 108. As described below, web intelligence engine 106 is configured to automatically access and review network-based content, including locating, fetching, ingesting, and/or downloading text, image, and/or video content. The set of storage devices 108 is configured to store content data, including a repository and/or index of content (i.e., text data, image and/or video files) and labels indicating whether corresponding content was generated by a transformer-based deep learning model. The content data stored by the set of storage devices 108 may include both (presumably non-generated) content accessed from public or private networks (i.e., the internet) by web intelligence engine 106 and a large set of content examples generated by (third-party) deep learning models, which may be labeled and used to train the set of AI-generated content classifiers 104 according to Blocks of a method M100 in FIG. 3 described below. Generally, server system 102 also includes and/or interfaces with a model training management system 110 configured to access and transmit content data to the set of AI-generated content classifiers 104 during pre-training, training, and fine-tuning stages according to applicable training protocols.

Computing system 100 also includes a communication interface 112 (e.g., an application programming interface, an instance of a user-facing application such as a web or mobile application) connecting server system 102 to client device(s) 103. Client device(s) 103 may be external to (i.e., remote from) server system 102 and include user computing devices—such as personal computers, laptops, tablets, and/or smartphones—as well as computing systems (e.g., networks, servers) operated by users such as content or social media platforms.

In some embodiments, communication interface 112 is configured to: receive, authenticate, and process (user) requests to determine whether text, image, audio and/or video content is AI-generated; transmit content indicated in the request (e.g., a text string, an image, audio or video file, a file hosted at a public URL) to the set of AI-generated content classifiers 104 for classification; and serve and/or output serve classification results (i.e., responses) from the set of AI-generated content classifiers to requesting client devices. In implementations, communication interface 112 defines a set of communication endpoints (e.g., HTTP endpoints), each of which interface between one or more AI-generated content classifiers 104 and a distinct user, client device, application (or extension or plug-in therefor, such as a web browser extension), platform, and/or project, thereby enabling server system 102 to concurrently receive, process, process, and serve results for classification requests submitted by multiple (unrelated) users (e.g., synchronously or asynchronously).

As described herein, computing system 100 can implement multiple communication protocols to receive requests and deliver classification results to both institutional users—such as content publishers or social media platforms—and individual users such as educators, administrators, managers, and editors. In one implementation, server system 102 includes an application programming interface that enables platforms to automatically submit classification requests to—and receive near-real time results from—the set of AI-generated content classifiers in response to events such as newly submitted posts. Additionally, server system 102 can interact with a user-facing software application layer, such as a computer web, or mobile application, that enables individual users to directly upload or link query content and promptly receive classification results via a user interface on a PC, laptop, or mobile computing device. Thus, server system 102 can leverage internal serving infrastructure to concurrently receive and process tens, hundreds, or thousands of content classification requests and return model responses from corresponding AI-generated content classifiers within seconds. By outputting confidence scores indicating probabilities that submitted query content was produced by generative AI models, computing system 100 therefore enables users to promptly take enforcement actions that align with their individual (i.e., unique) policies and risk tolerances. Although the discussion describes receiving queries from client devices 103, server system 102 may classify content as described herein without receiving queries from client devices 103. For example, a service may use server system 102 to classify content. The following will now describe classifiers 104 in more detail.

3.1 AI-Generated Content Classifiers—Overview

Figure 2:
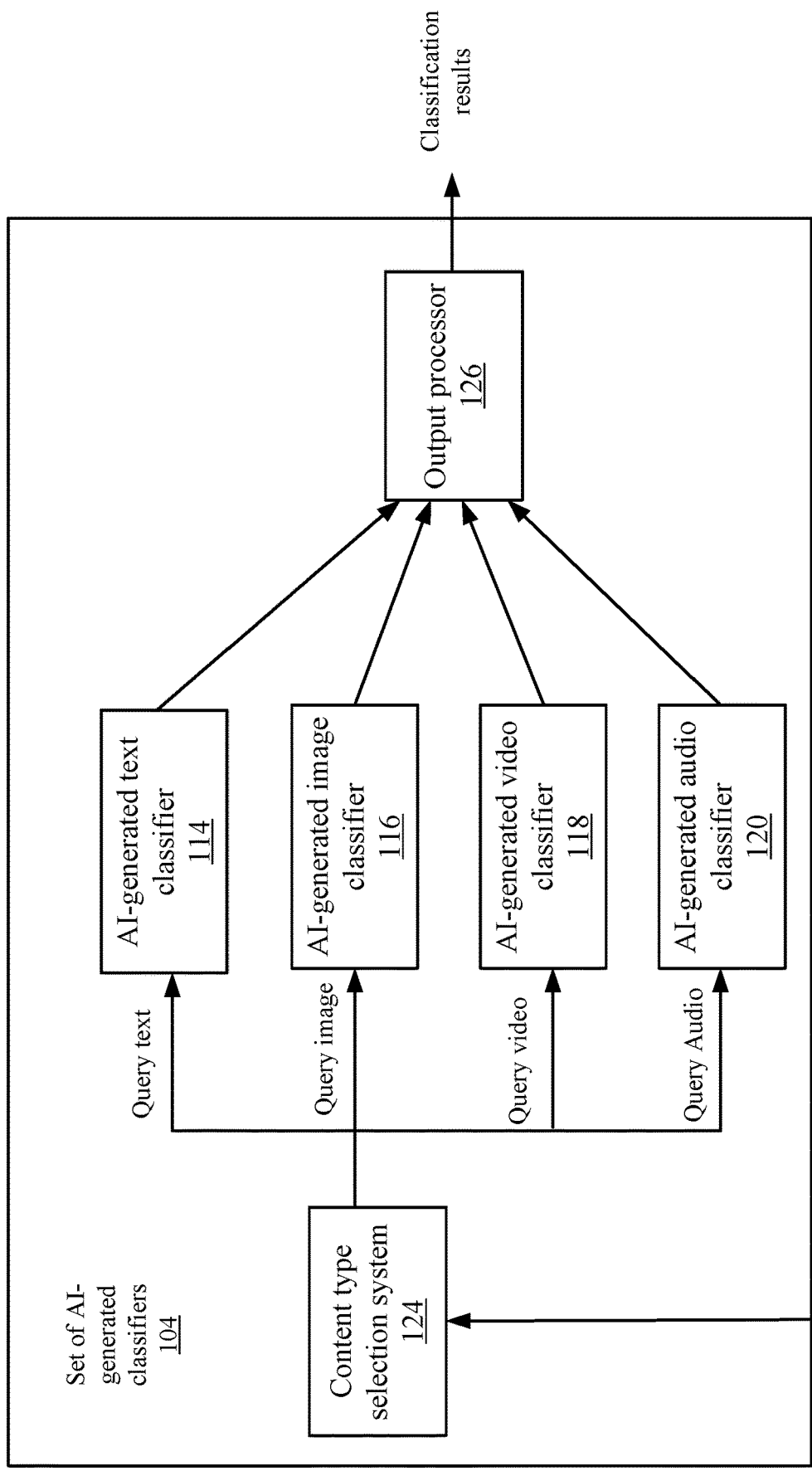
FIG. 2 depicts a more detailed example of classifiers according to some embodiments.

FIG. 2 depicts a more detailed example of classifiers 104 according to some embodiments. Server system 102 includes a network of one or more deep learning classifiers defining a set of AI-generated content classifiers 104. In some embodiments, the set of AI-generated content classifiers 104 includes an AI-generated text classifier 114, AI-generated image classifier 116, and AI-generated audio classifier 120. In one implementation, the set of AI-generated content classifiers 104 additionally or alternatively includes an AI-generated video classifier 118. Although these classifiers are described, classifiers for other types of content may be appreciated.

In some embodiments, each AI-generated content classifier 104 defines an artificial neural network, such as a convolutional neural network, a multilayer perceptron, a residual learning network, a vision transformer, or other suitable deep learning classifier architecture. Once trained, the set of AI-generated content classifiers 104 may be configured to: receive query content (e.g., a text string, a document file, an image file, audio file, and/or a video file specified in a classification request) and generate an embedding representation of the query content based on weights, parameters, and connections derived by the AI-generated content classifier during training. Based on correlations between the embedding representation and features of labeled examples analyzed by the AI-generated content classifier during training, the AI-generated content classifier can then compute—in near-real time—one or more confidence scores representing a probability that the query content was created by a generative model.

A content type selection system 124 can route query content indicated by classification requests as inputs to the corresponding AI-generated content classifier based on a selected content type, such as an indicated or detected content type. For example, content type selection system 124 may detect text data in the query content and route the text data to AI-generated text classifier 114, detect image data and route image data to AI-generated image classifier 116, etc. Then, the corresponding AI-generated content classifier may analyze the query content to generate one or more confidence scores for the query content. An output processor 126 may analyze the outputs from the content classifiers and generate classification results. The classification results may be in different formats. In some embodiments, output processor 126 outputs-via communication interface 112—the confidence scores to the communication endpoint and/or client device 103 that submitted the classification request. Thus, computing system 100 enables users and user applications to manually and/or programmatically submit query content to AI-generated content classifiers (which may be remotely hosted and served), access model classification results in near-real time (i.e., within seconds), and promptly take appropriate enforcement actions. For example, a social media or content platform can configure its backend infrastructure to automatically submit classification requests on newly posted content to computing system 100 (e.g., by programmatically sending an API call to communication interface 112). Then, based on confidence scores returned (e.g., via an API response from communication interface 112) by the set of AI-generated content classifiers 104—such as in response to one or more these confidence scores exceeding a threshold probability that the query content is AI-generated—the platform can automatically remove the corresponding post, ban the posting user, or flag the post for moderator review in accordance with its content policies.

In some embodiments, an example of output from AI-generated text classifier 114 may be confidence scores for portions of the query text, such as each paragraph. For example, the confidence scores for a three-paragraph text input may be: par. 1—0.93, par. 2—0.06, and par. 3—1.00. If the confidence scores are from the 0-1.0, with a higher score meaning more likely that the input is AI-generated, par. 1 and par. 3 with scores of 0.93 and 1.0, respectively, are more likely to be AI-generated compared to par. 2 with a score of 0.06.

Figure 3:
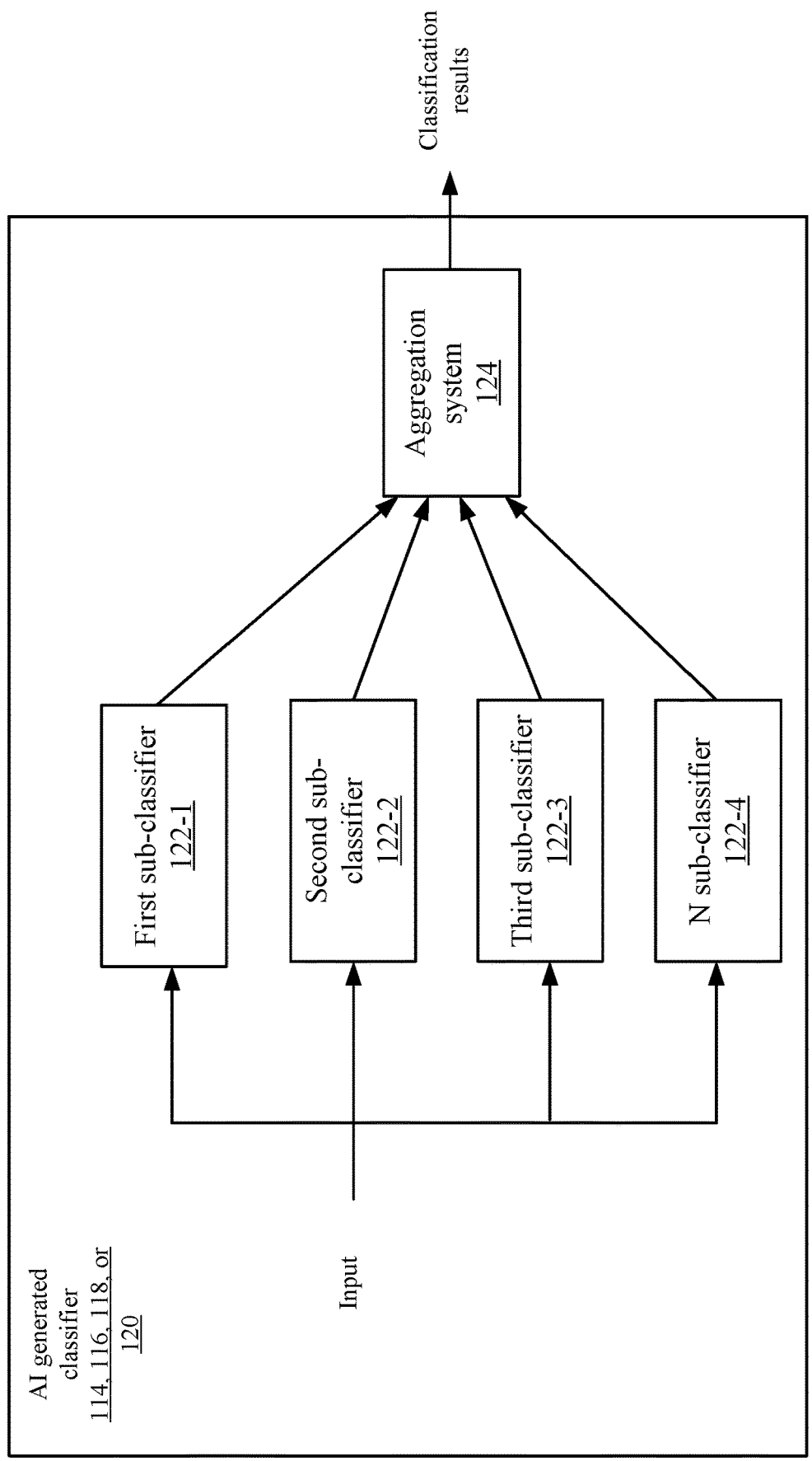
FIG. 3 depicts an example of a multi-headed classifier according to some embodiments.

In some implementations, one or more AI-generated content classifiers 104 are multi-headed classifiers configured to differentiate between outputs of several different generative models or services. FIG. 3 depicts an example of a multi-headed classifier 104 according to some embodiments. The following discussed one multi-headed classifier 104, but one or more of the classifiers 104 may be multi-headed. Each multi-headed classifier 104 defines a set of sub-classifiers 122-1, 122-2, 122-3, . . . , 122-N (collectively sub-classifiers 130). Sub-classifiers 130 may be separately trained on content created by a single generative model to learn, infer, or derive features (e.g., linguistic choices, syntax, pixel patterns) that are specialized and/or unique to that particular model. Each sub-classifier 122 (or "model head") can therefore (independently) output a confidence score proportional to a computed probability that query content was created by a particular generative model represented by the sub-class.

In some implementations, a multiheaded AI-generated text classifier 114 may define at least three distinct classes, including: a first class associated sub-classifier 122-1 trained on text generated by a first type of large language models; another class associated with a second sub-classifier 122-2 trained on text generated by a second type of large language model; yet another class associated with a third sub-classifier 122-3 trained on text generated by a third type of large language model, etc. In other embodiments, a multiheaded AI-generated image classifier 116 may, for example, define at least five classes using five sub-classifiers (not shown), where confidence scores in each sub-class are output by a separate sub-classifier specifically (e.g., exclusively) trained on images or video produced (or edited) by the corresponding generative models.

During operation, server system 102 can therefore (concurrently) execute each model head within a multiheaded AI-generated content classifier on query content in order to independently compute confidence scores for all supported generative models. An aggregation system 128 can aggregate and/or combine this set of confidence scores into a single response output. The aggregation may be performed in different ways. In some examples, aggregation system 128 can output the individual scores. Also, aggregation system 128 can generate and output an overall confidence score representing an overall (e.g., total) probability that query content was created by AI more generally (i.e., by any one of the supported generative models), which may either be predicted (e.g., inferred) by the multiheaded AI-generated content classifier as a separate classification, or computed directly based on the set of confidence scores generated by each model head (e.g., a weighted sum) after inference. Each head may be weighted based on different factors. For example, server system 102 may analyze the input and assign weights to different heads based on a relevance of the input to the sub-classifier. Also, the weights may be determined based on a confidence level from sub-classifiers. The confidence scores may be output to the requesting client device 103, thereby providing users with more granular information on which generative model, if any, created the query content.

Figure 4:
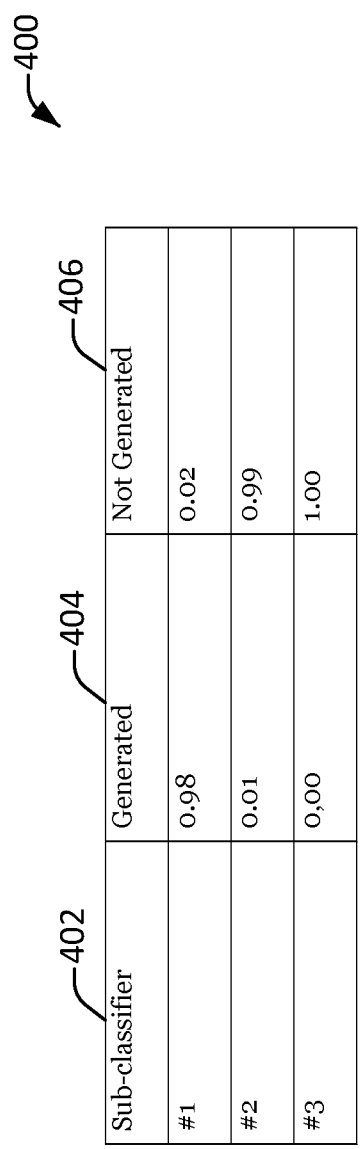
FIG. 4 depicts a table of an example of outputs from sub-classifiers according to some embodiments.

FIG. 4 depicts a table 400 of an example of outputs from sub-classifiers 122 according to some embodiments. A column 402 lists the sub-classifier 122, such as sub-classifier 122-1, 122-2, and 122-3. Column 404 lists a confidence score that the input is generated by the generative model associated with the sub-classifier. Column 406 lists a confidence score that the input is not generated by the generative model associated with the sub-classifier. The scores may be in the range of 0.0 to 1.0 with a higher score indicating a higher confidence.

In the example of FIG. 4, the results may indicate that there is a strong confidence the input was generated with the generative model associated with sub-classifier 122-1 because the output has a value of 0.98 for the generated label and 0.02 for the not generated label. Also, the other sub-classifiers 122-2 and 122-3 have low scores of 0.01 and 0.02, respectively for the generated label and high scores for the not generated label of 0.99 and 1.00, respectively.

The following will now discuss the training of classifiers 104.

3.2 Web Intelligence Engine

Referring back to FIG. 1, computing system 100 also includes and/or interfaces with web intelligence engine 106, which defines a set of software modules configured to retrieve content data for use in training the set of AI-generated content classifiers 104 prior to operation. Specifically, web intelligence engine 106 can execute web crawling algorithms to locate, access, collect and/or store text (e.g., articles, publications, written works), image files, audio files, and video files from web pages, as well as associated metadata. Starting from initial set of (e.g., random) resource locators such as URLs, web intelligence engine 106 can automatically (i.e., without further input): analyze webpages (e.g., via HTML descriptions) to identify and locate text, image, audio, and/or video content data; fetch and/or download content data to the set of storage devices 108; and identify and follow and repeatedly follow hyperlinks to other, new webpages to source additional content data. Web intelligence engine 106 is also configured to tag and/or label content data with any accessible file metadata, including content type and timestamps for when retrieved content data was created, uploaded, and/or published, thereby enabling computing system 100 to aggregate and store large sets of web content and to partition and filter these datasets into training datasets as described below.

4. Aggregation, Pre-Processing, and Labeling of Training Data

Generally, the performance (e.g., accuracy, precision, recall) of deep learning classifiers depends significantly on both the quality of training data (i.e., size of training set, diversity of examples, inclusion of difficult/edge cases such as adversarial attacks) and the accuracy of classification labels used to teach the model during training. Thus, server system 102 sources, aggregates, and accurately labels large sets of both generated and non-generated (i.e., human-created) text, image, audio, and video content, as well as perform a range of augmentations on (e.g., manipulations of) the content data that mimic real-world techniques used to obscure the sources of or otherwise edit or manipulate AI-generated content. By training the set of AI-generated content classifiers 104 on the custom training corpus created, server system 102 can therefore (greatly) increase the overall performance of each classifier 104 when deployed to process classification requests submitted by users during operation.

More specifically, during a data collection period, server system 102 can continuously execute web intelligence engine 106 to source and store a large set of content data (e.g., tens of thousands of examples, hundreds of thousands of examples) in the set storage devices 108. Server system 102 can then (e.g., according to administrator inputs received at model training management system 110): sort content data stored in set of storage devices 108 into distinct data sets by content type (e.g., text, image, audio, video sets); filter these datasets according to timestamp data accessed by web intelligence engine 106; and label (individual) content files in each data set for use in a corpus of labeled content data used to train the set of AI-generated content classifiers 104 (hereinafter the "training corpus").

Server system 102 can then filter content data accessed by web intelligence engine 106 according to when that content was created, uploaded, or published prior to labeling in order to exclude and/or remove content created after the public release date of corresponding generative models (or "cutoff date") from the training corpus, thereby greatly reducing (or eliminating) the possibility web content used for training includes AI-generated content. In one example, web intelligence engine 106 is configured to ignore or discard (e.g., decline to download and store) content data created or published after a cutoff date according to associated metadata. In another example, model training management system 110 can filter and/or sort content data that is stored in the set of storage devices 108 by timestamp and delete or remove any content data that was not identifiably created, uploaded, or published before the cutoff date (e.g., according to administrator/developer instructions). Because web intelligence engine 106 can source and retrieve a vast amount of content files (e.g., hundreds of thousands of unique content files), even aggressive filtering criteria retain a very large set of examples for inclusion in the training corpus. Thus, server system 102 can assemble a large, diverse set of text, image, and video content that is practically certain to exclude AI-generated content as a whole and/or AI-generated content from [a] certain generative model[s]. Server system 102 (e.g., via model training management system 100) can then tag and/or label some or all of the filtered content data as "not AI-generated" and add the labeled content data to appropriate training sets for each AI-generated content classifier 104. In some implementations, these training sets may additionally or alternatively include content data repurposed from open-source and/or academic datasets developed for training other types of AI models before the corresponding cutoff date (i.e., by replacing original labels with "not AI-generated" for purposes of training the set of AI-generated content classifiers 104).

Separately, the set of storage devices 108 also stores (large) sets of example text, image, audio and/or video content generated by publicly released transformer-based deep learning models that are used to train the set of AI-generated content classifiers 104. Generally, AI-generated content data is created by manually or programmatically sampling outputs of these generative models directly and labeling these outputs according to source. For example, synthetic, AI-generated text data may be created by passing a large set of prompts—curated, designed, or programmatically generated to elicit model responses in a diversity of writing styles, subject matter, lengths, and complexity—to each generative large language model available for public and/or researcher use. Outputs of each generative model can then be saved, labeled with the source model, and uploaded to the set of storage devices 108 as part of the training corpus for AI-generated text classifier 114. Similarly, synthetic AI-generated image and/or video data may be created by designing a large set of text prompts to elicit a diverse set of image content that ranges in style (e.g., photorealistic, graphic/animated, abstract) and subject matter (objects, subjects, scenes). The set of text prompts may be input to each available text-to-image generation (e.g., diffusion) model. Outputs of each generative model can then be saved, labeled according to their source model, and uploaded to the set of storage devices 108 as part of the training corpus for AI-generated image classifier 116 and/or AI-generated video classifier 118. In implementations where the set of AI-generated content classifiers 104 includes multi-headed classifiers, AI-generated content data may be further rearranged, partitioned, or relabeled as subsets used to train each sub-classifier on outputs of a particular source model. For example, computing system 100 may create an additional copy of the training corpus for each sub-classifier and relabel outputs of generative models other than the one corresponding to that sub-classifier as negative examples (e.g., relabel text generated by a first generative model as negative in the training corpus used to train a second generative model).

Once it has sourced, sorted, and labeled an initial corpus of training data, server system 102 can then perform programmatic edits, manipulations and/or augmentations on content data included in the training corpus, in order to expose the set of AI-generated content classifiers 104 to a wide variety of obfuscation, manipulation, and adversarial attack techniques during training that are similar to (or more difficult to analyze than) obfuscations, refinements, and manipulations (referred to collectively herein as "augmentations") it may encounter during operation, thereby increasing the performance (e.g., classification accuracy) of each (trained) AI-generated content classifier.

Different augmentations may be made to training content to improve the training process. The following discusses examples of augmentations to text, images and video, and audio. The augmentations may teach classifiers 104 to recognize attempts to manipulate AI-generated content to obfuscate that the content is AI-generated.

4.1 Augmentations: Text

Prior to training AI-generated text classifier 114, server system 102 can programmatically edit, augment, and/or manipulate AI-generated text in the initial training corpus in order to mimic edits that human users may make to obfuscate or refine generative model outputs when using them as part of written work. For example, server system 102 can deploy additional machine learning and/or artificial intelligence algorithms on (a subset of) AI-generated text in the initial training corpus to replace words with less common synonyms, paraphrase or reword sentences, insert citation clauses or footnotes, delete introductory clauses, or introduce spelling and/or grammatical errors. Generally, server system 102 preserves (i.e., does not change) the label on augmented text, even for (initially) AI-generated text that has been heavily augmented. Thus, by analyzing AI-generated text augmented according to obfuscation techniques or refinements (i.e., manual editing, repurposing, or rewriting) that routinely defeat existing AI-generated text detection tools during training stages, AI-generated text classifier 114 can automatically learn to ignore or account for these obfuscation techniques and refinements when predicting whether query text is AI-generated, thereby substantially increasing the performance (e.g., accuracy) when deployed by server system 102 to process classification requests during operation. These augmentation techniques also enable AI-generated text classifier 114 to perform more generalized (and more useful) classification tasks, such as whether the query text contains or is based on AI-generated text (i.e., has been subsequently edited, refined, or partially rewritten by a human author), in addition to whether the query text was sourced directly from a generative model output without subsequent modification.

4.2 Augmentations: Images and Video

Similarly, server system 102 can create or access labeled image and/or video data that is programmatically augmented or manipulated according to a range of adversarial attack techniques used to obfuscate the source of AI-generated visual content. For example, server system 102 can deploy algorithms, such as additional machine learning or artificial intelligence algorithms, to modify image and/or video content included in initial training corpus by introducing (e.g., adding) overlay effects, Gaussian blur, noise or pixelation, cropping, rotations, filters, and/or color shifts while preserving the label associated with augmented training data. Thus, by exposing AI-generated image classifier 116 and/or AI-generated video classifier 118 to augmented examples of AI-generated content during training that may appear (substantially) different from unmodified versions, these classifiers can automatically learn to ignore or account for similar adversarial techniques used to obfuscate AI-generated image and video content when analyzing query content, thereby substantially increasing the classification accuracy of these classifiers when deployed by server system 102 to process classification tasks during operation. Similarly, server system 102 can create and/or access image and/or video data that has been manipulated using conventional (e.g., non-AI) image and video editing software that reflect or simulate additional edits or refinements that users may make prior to using AI-generated image or video content as a final product. Thus, AI-generated image classifier 114 and AI-generated video classifier 118 can also perform more the generalized (and more useful) classification task of determining whether query content includes or is based on AI-generated image or video data in addition to whether the query content was sourced directly from a generative model output without subsequent modification.

Once server system 102 has generated or accessed the final, labeled training corpus (e.g., including augmented training examples), the system can then train each AI-generated content classifier 104 on its corresponding training set(s).

4.3 Augmentations: Audio

Prior to training AI-generated audio classifier 120, server system 102 can programmatically edit, augment, and/or manipulate AI-generated audio content in the initial training corpus in order to mimic edits that users may make to obfuscate, refine, or repurpose AI-generated audio outputs prior to use. For example, server system 102 can deploy algorithms, such as additional machine learning and/or artificial intelligence algorithms, to generate augmentations of (a subset of) AI-generated audio content or audio from AI-generated video content within the initial training corpus stored in the set of storage devices 108. In particular, server system 102 can inject static or noise, add filters or compression, adjust mixing or mastering qualities, or mix AI-generated audio into non-generated audio tracks. By exposing AI-generated audio classifier 120 to augmentations similar to those it may encounter during operation without changing the label on augmented training examples, AI-generated audio classifier 120 can learn to ignore or account for such augmentations when analyzing query content, thereby substantially increasing the accuracy of AI-generated audio classifier 120 when deployed by computing system 100 to process audio classification requests. These augmentation techniques also enable AI-generated audio classifier 120 to perform more generalized and more useful classification tasks, such determining whether a query audio or video file contains or is based on AI-generated audio data.

5. Pre-Training

During training stages, computing system 100, via model training management system 110, initializes each AI-generated content classifier 104 and executes each classifier on its corresponding training corpus. Starting from an initial set of parameters (e.g., weights, paths, and/or connections between network nodes and layers), each AI-generated content classifier 104 can continuously update these parameters by analyzing labeled content in each final training corpus according to one or more deep learning algorithms in order to infer, derive, and/or learn correlations between features of example content data and their labels (e.g., whether the example content was in fact AI-generated).

In training AI-generated text classifier 114, model training management system 110 executes the classifier on labeled text data within the final training corpus. By analyzing each piece of example text in conjunction with the corresponding label, AI-generated text classifier 114 learns and/or updates parameters for encoding (abstract) features of input text, such as in a high-dimensional vector space (e.g., feature space, embedding space). Generally, features that are correlated with a particular label (e.g., AI-generated, not AI-generated, generated by a particular model) are identified automatically by AI-generated text classifier through analysis of training examples, and may be highly dissimilar to human concepts or heuristics for characterizing text. For example, features encoded by AI-generated text classifier may include low-level features—such as specific word choices or relative ordering of words—and more abstract, higher-level features such as perplexity (range of vocabulary used to describe similar semantic concepts) and burstiness (e.g., degree of variation in sentence length and structure). Thus, by analyzing a large set of accurately labeled examples of generated and non-generated text, AI-generated text classifier 114 learns parameters to encode, quantify, and/or represent these features in a highly descriptive embedding space that accounts for a range of obfuscation techniques and refinements, thereby enabling the classifier to infer accurate classification probabilities for query text based on correlations between features of the query content and similar features of labeled training text.

During training stages, model training management system 110 can implement similar techniques to initialize and update parameters of AI-generated image classifier 116, AI-generated video classifier 118, and AI-generated audio classifier 120, thereby enabling these models to infer or derive parameters for generating highly descriptive embedding representations of image, audio, and video content. Features that are correlated with a particular label (e.g., AI-generated, not AI-generated, generated by a particular model) are identified automatically by each classifier through analysis of training examples, and may be highly dissimilar to visual and/or auditory features assessed by humans when analyzing images. For example, embedding representations generated by AI-generated image classifier 116 and AI-generated video classifier 118 may encode both typical computer vision features (e.g., blobs, edges, gradients) and features unique to generated content, such artifacts, pixel patterns, or pixel signatures leftover from the iterative de-noising processes of diffusion models that may be invisible to human viewers. Embedding representations generated by AI-generated video classifier 118 may also encode temporal consistency features, such as whether groups of pixels move (e.g., relative to each other) in a natural, coherent manner across video frames. Similarly, embedding representations generated by AI-generated audio classifier 120 may encode features representing de-noising artifacts left behind by audio diffusion models, spectrum and/or waveform information, and the like. Thus, by analyzing a large set of accurately labeled examples of generated and non-generated images and video, AI-generated image classifier 116, AI-generated video classifier 118, and AI-generated audio classifier 120 automatically learn optimal parameters to encode, quantify, and/or represent dispositive features in a highly descriptive embedding space that accounts for a range of augmentation techniques, thereby enabling these classifiers to infer accurate classification probabilities for query content based on correlations between features of the query content and similar features of labeled training examples.

In implementations, server system 102 can implement a multi-stage training process that recruits previously trained instances (e.g., versions) of the set of AI-generated content classifiers 104 to label additional content data and clean and/or relabel the training corpus in order to train new instances of these classifiers. Specifically, model training management system 110 can execute each classifier on additional content data to generate synthetic labels for use in subsequent training stages and/or relabel training examples that may have been initially mislabeled in earlier stages, which may then be reviewed and accepted by an administrator or developer. Thus, server system 102 can iteratively leverage previously trained instances of each classifier in order to increase the size and/or label accuracy of the training corpus for the (final) set of AI-generated content classifiers 104, thereby increasing the performance (e.g., accuracy) of each classifier prior to operation. Additionally, at each training stage in the multi-stage progressive training regimen, model training management system 100 can execute each AI-generated content classifier 104 on a progressively larger set of training data and/or training data that is subject to heavier augmentations in order to expose the model to progressively more difficult classification tasks, thereby improving classification accuracy of the final, trained classifier.

6. Operation: Receiving Classification Requests

Figure 5:
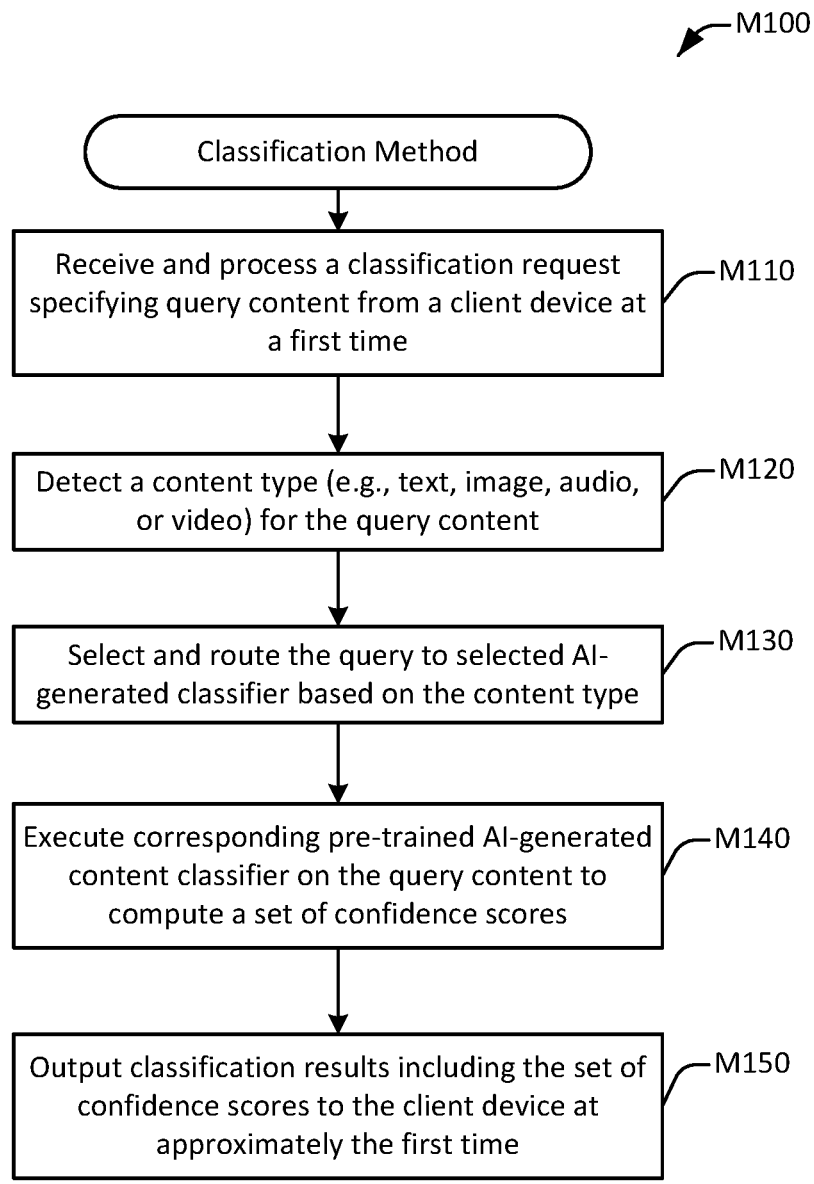
FIG. 5 depicts a simplified flowchart for automatically detecting content generated by artificial intelligence according to some embodiments.

Once trained, server system 102 can deploy the set of AI-generated content classifiers 104 to generate and return highly accurate model classification results on query content submitted by client device(s) in near-real time. FIG. 5 depicts a simplified flowchart M100 for automatically detecting content generated by artificial intelligence according to some embodiments. The method M100 and its variations are described herein as being implemented by a distributed and/or cloud computer network in conjunction with one or more AI-generated content classifiers 104 and associated corpuses of training data. However, these methods can also be implemented by a local computer system, a peer-to-peer computing network, or any other computer architecture suitable to train a deep learning network or other suitable machine learning model, process user requests to query the deep learning network, and synchronously return and/or serve model outputs in response to these requests. While these methods are described herein as primarily directed to identifying content generated by transformer-based deep learning networks such as large language models and diffusion models, similar techniques can be used to train and deploy deep learning classifiers for identifying text, image, audio and video content produced by other types of generative models such as generative adversarial networks, multi-modal models, etc.

At block M110, at a first time, server system 102 receives and processes, via communication interface 112, a classification request specifying query content from a client device 103. At Block M110, computing system 100 can receive a classification request from a client device 103 at communication interface 112, which connects server system 102—including the set of AI-generated content classifiers 104—to one or more client (e.g., user) device(s), applications, and/or platforms.

In implementations where communication interface 112 defines a (standalone) application programming interface, server system 102 receives the classification request as a direct API call to an HTTP endpoint associated with the client device 103 which specifies, references, and/or includes query content (such as a text string, a document, a PDF, an image file, an audio file, a video file, a link to or URL for hosted image, text, audio, or video content). Generally, users can make API calls either programmatically or automatically in response to events or conditions on a client platform or application. For example, content publishers and social media platforms can configure their backend infrastructure to automatically generate and send API calls populated with their authentication token and newly-posted text, image, audio, and/or video content (or content flagged by human moderators) to server system 102 and receive classification results (i.e., confidence scores from the set of AI-generated content classifiers 104) as an API response.

In one implementation, communication interface 112 also includes a user-facing software application—such as a desktop, web, or mobile application (or extension or plug-in therefor, such as a web browser extension)—built on the application programming interface that enables users to submit content classification requests via inputs to a user interface. For example, the user interface may enable users to directly upload image, text, audio, and/or video files and/or provide a link (e.g., a URL) to text, image, audio, and/or video content hosted on the internet. The user facing software application layer can then automatically populate and send API calls to server system 102 with uploaded/linked content as query content, receive an API response with classification results from server system 102 (i.e., including confidence scores generated by the set of AI-generated content classifiers 104), and display classification results-such as a probability that the query content was created by generative AI—directly at the user interface. Thus, the user-facing software application layer allows individual, non-technical users—such as educators, administrators, and managers—to easily submit classification requests and accurately determine whether content of interest (e.g., essays, exams, copy, graphics, art) was generated by AI, which may otherwise be difficult or impossible to determine by inspecting the content themselves.

At Block M120, server system 102 can also identify and/or detect a content type (e.g., text, image, audio, or video) for the query content indicated in the classification and route the query content to the corresponding AI-generated content classifier (e.g., AI-generated text classifier 114, AI-generated image classifier 116, or AI-generated video classifier 118) via internal serving infrastructure of server system 102. For example, server system 102 can identify the content type based on additional data received at communication interface 112, such as a content type selected by a user via user-facing software application layer and/or indicated in an API call field. Additionally or alternatively, server system 102 can automatically detect an appropriate content type for query content based on file characteristics of the query content (e.g., a file extension format). By executing Blocks of the method M100, computing system 100 can therefore enable users to submit different types of query content and receive classification results in substantially the same way, even if the underlying AI-generated content classifiers employed by computing system 100 to analyze and classify those types of query content are distinct models. At block 130, server system 120 selects and routes the query to the selected AI-generated classifier based on the content type. If the content type is not being used, then server system 120 may send the content to all classifiers 104, or a designated subset.

7. Operation: Detecting AI-Generated Content

At Block M140, server system 102 executes the first pre-trained AI-generated content classifier 104 on the query content to compute a set of confidence scores. These confidence scores are proportional to predicted probabilities that the query content includes content data produced by a generative AI model and are generated based on parameters learned by the first pre-trained AI-generated content classifier during a training stage. Generally, at Block M140, server system 102 passes the query content as input to one of the classifiers in the set of AI-generated classifiers (i.e., based on content type) and executes one or more deep learning algorithms that output the confidence score.

For classification requests including query text, server system 102 can execute AI-generated text classifier 114 to generate an embedding representation of the query text according to parameters and hyper-parameters, weights, paths, and/or connections learned by AI-generated text classifier 114 during training stages described above. Generally, the embedding representation is a vector in a many-dimensional feature space (i.e., embedding space) derived during training that encodes both low level features (e.g., word selection, relative order of words) and high-level features (e.g., sentence or paragraph structure, perplexity, burstiness) of the query text. AI-generated text classifier 114 can then compute a probability that the query text was synthesized or edited by a generative AI model based on a set of correlations between features encoded by the embedding representation and corresponding features of both positive examples (e.g., text labeled as containing AI-generated text, text previously predicted by the classifier to be AI-generated) and negative examples (e.g., text labeled as human-written, text previously classified as not AI-generated) analyzed by the classifier during training. For example, AI-generated text classifier may compute a distance metric (e.g., based on Euclidean distance, cosine similarity, normalized inner product, etc.) in the embedding space that weights correlations between all features encoded in the embedding representation and features of clusters of previously analyzed embeddings representing positive and negative examples. AI-generated text classifier can then weight and/or normalize these distance metrics into a confidence score for each class—such as a decimal value between 0 and 1—that represents the model's predicted probability that the query text includes content that was wholly or partially generated and/or edited by a large language model or similar transformer-based deep learning network. In implementations where classifier 114 includes a multi-headed AI-generated text classifier, each sub-classifier can concurrently and independently implement similar techniques to generate a confidence score for its corresponding generative model.

In one implementation, AI-generated text classifier 114 can compute a separate confidence score for each sentence and/or paragraph in the query text. For example, server system 102 may split (e.g., segment) the query text into a sequence of sentences or paragraphs (or sentence-like or paragraph-like segments) based on punctuation, indentation, or other special characters and pass each sentence or paragraph as an input to AI-generated text classifier 114 in order to generate a confidence score for each sentence or paragraph. Server system 102 can therefore return each confidence score in a response to the classification request and/or compute an overall confidence score for the query text based on sentence-level or paragraph-level scores.

For classification requests including a query image, server system 102 can execute AI-generated image classifier 116 on the query image to generate an image embedding representation of query image according to parameters learned by the classifier during training as described above. Generally, AI-generated image classifier 116 implements similar techniques as described above with respect to AI-generated text classifier 114 to compare the image embedding to embeddings generated for training images and weight correlations between features into a normalized confidence score that represents a probability that the query image was wholly or partially generated and/or edited by transformer-based diffusion model. AI-generated audio classifier 120 can implement similar techniques to generate embedding representations of query audio files (and/or embedding representations of audio tracks within query videos) and derive and weight correlations between the embedding representations and embedding representations of training examples in order to generate normalized confidence scores proportional to probabilities that query audio and/or video files include AI-generated audio content. In implementations where server system 102 includes a multi-headed AI-generated image classifier 116, each sub-classifier can concurrently and independently implement similar techniques to generate a confidence score for its corresponding generative model.

For classification requests including a query video, server system 102 can compute classification results in multiple ways. In one variation where server system 102 includes AI-generated video classifier 118, server system 102 can generate an embedding representation of the query video according to parameters learned by the AI-generated video classifier 118 during training and compute a (single) confidence score for the query video using similar techniques as described above.

In another variation, server system 102 generates video classification results indirectly by executing AI-generated image classifier 116 on representative frames sampled from the query video. Specifically, server system 102 can capture frames from the query video at a (configurable) sampling rate (e.g., one frame per second, five frames per second) and execute AI-generated image classifier 116 to generate a confidence score for each sampled frame. Server system 102 can then implement post-classification thresholding logic to combine these confidence scores into a single confidence score representing a probability that the query video includes AI-generated content (e.g., was produced by a generative diffusion model, has been edited by a diffusion model). For example, server system 102 can compute the overall confidence score based on (i) the value of each confidence score generated by the AI-generated image classifier; (ii) the number of frames for which the confidence score meets (e.g., exceeds) a threshold probability (e.g., assigning higher weight to above-threshold scores); and/or (iii) whether the high-confidence frames occur in sequence. In this variation, server system 102 can also execute AI-generated audio classifier 120 on the query video in order to (separately) generate a confidence score for the query video's audio track, which may be output separately from the image-based score(s) or weighted into the overall confidence score for the query video.

8. Operation: Model Responses and Output

At Block M150, server system 102 outputs, via communication interface 112, classification results including the set of confidence scores to the client device at approximately the first time. Server system 102, via communication interface 112, can return all confidence scores computed by the set of AI-generated content classifiers 104 on the query content to the requesting client device 103, thereby returning and/or visually displaying highly accurate predicted probabilities that the query was created by generative AI.

In implementations where communication interface 112 is a standalone API, server system 102 can leave the HTTP connection with client device 103 open while executing AI-generated content classifier(s) 104. Then, server system 102 can populate a data structure (e.g., a JSON object) with all confidence scores computed by AI-generated content classifier(s) 104 and synchronously return or output this data structure as a classification result via API response (i.e., dynamically within seconds of receiving the classification request at Block M110). For example, in implementations where the AI-generated content classifier 104 is a multi-headed classifier, the classification result may include confidence scores for each sub-class, where each sub-class corresponds to a sub-classifier trained on outputs of a particular generative model for that content type. Additionally or alternatively, the classification result may include a confidence score for each sentence and/or paragraph of query text analyzed by AI-generated text classifier 114 and pair each confidence score with its corresponding text segment. Similarly, the classification result may include a set of confidence scores paired with timestamps across a range of playback times for query videos and audio tracks analyzed by AI-generated image classifier 116, AI-generated video classifier 118, and/or AI-generated audio classifier 120. Thus, the classification result can provide a detailed, highly accurate description of probabilities that specific parts of query content (e.g., segments of text, videos, or audio clips) are AI-generated and/or generated by particular models. By synchronously returning classification results as a compact data structure via API response, computing system 100 therefore enables user applications, platforms, and/or services (e.g., content publishers, streaming services, social media platforms) to automatically take any desired moderation actions—such as removing AI-generated content—in near-real time in accordance with their individual content policies.

In implementations where communication interface 112 includes and/or interacts with a user-facing software application, server system 102 can cause classification results to be displayed at a user interface on client device 103 at Block M130. In one example, the software application may summarize the classification result in an (interactive) results field by displaying the query content (or a preview of the query content) alongside a message such as "94.0% likely to contain AI-generated content," where the probability is based on the overall confidence score indicated in the classification result. Then, in response to a user input on the results field, the software application may transition (e.g., expand, extend) the results field to display all confidence scores included in the classification result. For example, in implementations where the AI-generated content classifier is a multi-headed classifier, an expanded results field can display classification results from each sub-classifier based on confidence scores in the classification result (e.g., "This image is 87.1% likely have been generated by Generative Model #2;" "This image is 5.9% likely to have been generated by a diffusion model," etc.). For text content, the expanded results field can also include sentence-by-sentence or paragraph-by-paragraph confidence scores. The user interface may also display these more granular classification results visually, such as by highlighting or otherwise emphasizing sentences and/or paragraphs for which the predicted probability of including AI-generated text meets or exceeds a (configurable) confidence threshold (e.g., 90%). Similarly, for video content and audio clips, the expanded results field can include confidence scores for a set of playback timestamps displayed in the form of a list or a graph and/or enable users to advance the video preview content or audio track to the first timestamp in playback that is likely to contain AI-generated (or AI modified) video and/or audio data. Thus, by executing Blocks of the method M100, server system 102 can therefore enable individual users—such as educators, administrators, managers, or moderators—to quickly access and view classification results output by the set of AI-generated content classifiers 104 in an actionable, intuitive format within seconds of submitting classifications.

Figure 6:
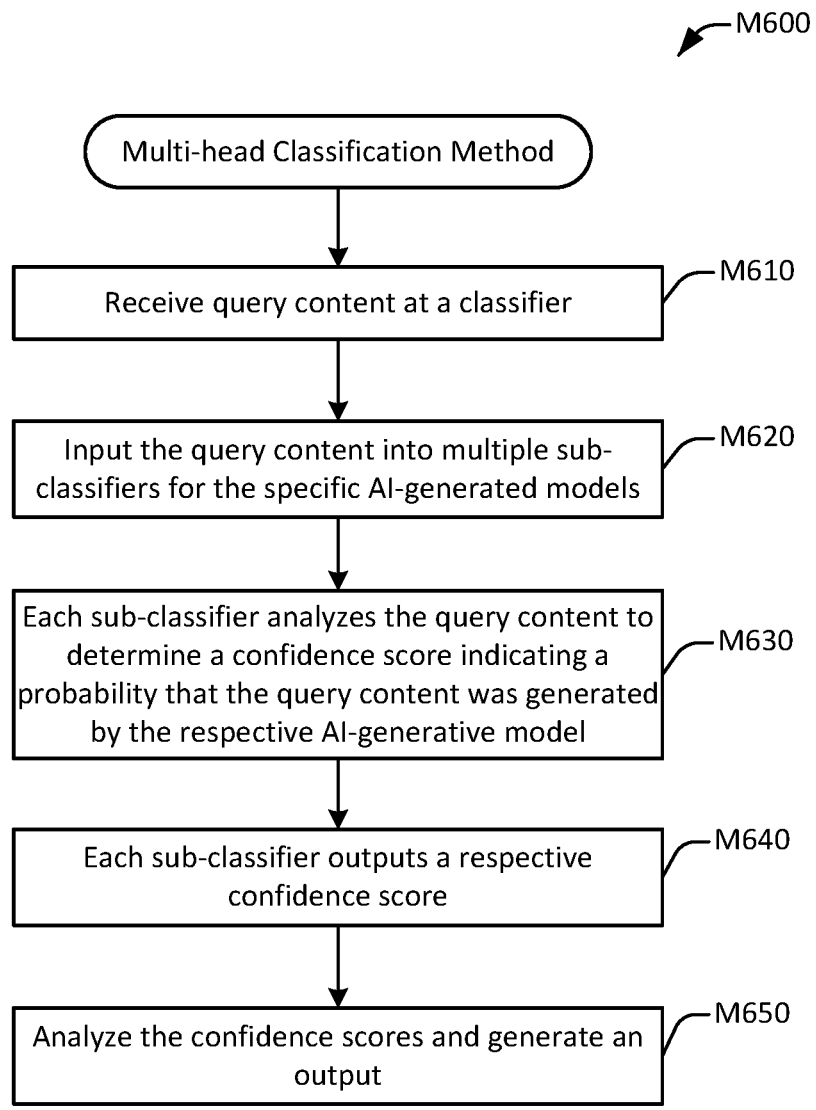
FIG. 6 depicts a simplified flowchart of a method for performing a multi-head classification according to some embodiments.

FIG. 6 depicts a simplified flowchart M600 of a method for performing a multi-head classification according to some embodiments. At M610, a classifier 104 receives query content. The classifier may be any one of the set of classifiers 104. At M620, classifier 104 inputs the query content into multiple sub-classifiers 122 for the specific AI-generated models. At M630, each sub-classifier 122 may analyze the query content to determine a confidence score indicating a probability that the query content was generated by the respective AI-generative model. At M640, each sub-classifier outputs a respective confidence score.

At M650, an aggregation system 124 may analyze the confidence scores and generate an output. The output may indicate whether the query content was generated by an AI-generative model in general (e.g., without specifying the AI-generative model). Also, the output may specify one or more AI-generative models based on the respective confidence scores.

9. Computer System

Figure 7:
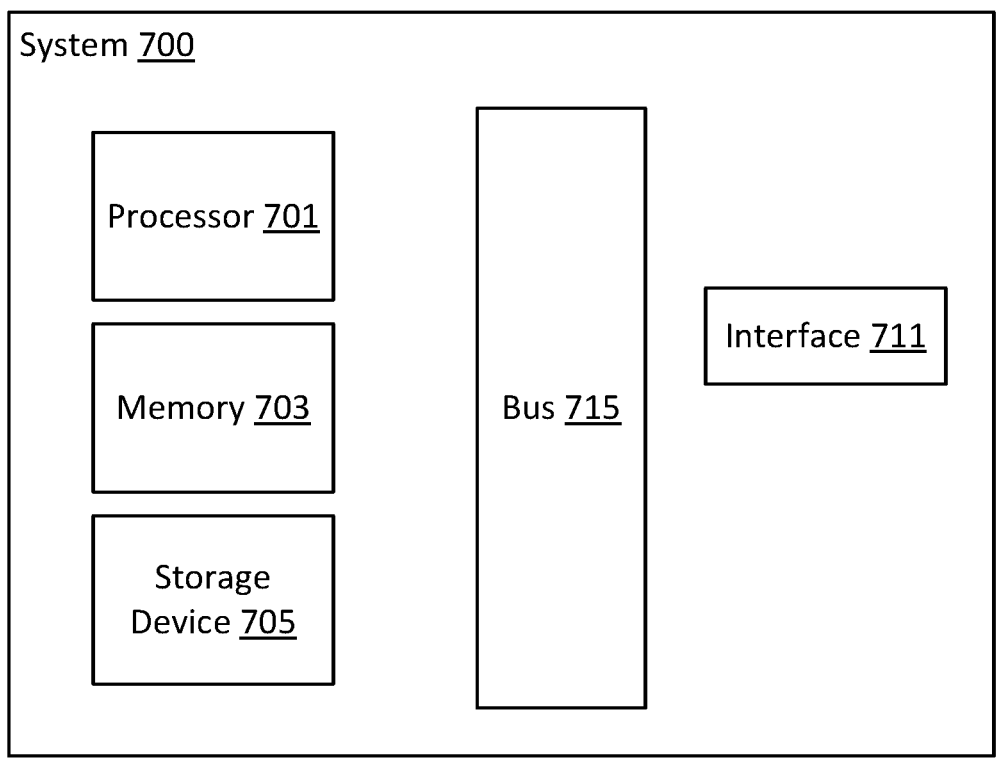
FIG. 7 illustrates one example of a computing device.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as a variety of devices such as entities in computing system 100, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. Memory 703 may be random access memory (RAM) or other dynamic storage devices. Storage device 705 may include a non-transitory computer-readable storage medium holding information, instructions, or some combination thereof, for example instructions that when executed by the processor 701, cause processor 701 to be configured or operable to perform one or more operations of a method as described herein. Bus 715 or other communication components may support communication of information within system 700. The interface 711 may be connected to bus 715 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise. The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

The invention claimed is:

1. A computing system comprising:
one or more processors; and
a set of memory resources storing a set of artificial intelligence (AI)-generated content classifiers and instructions that, when executed by the one or more processors, cause the computing system to:
aggregate a training dataset that includes examples, wherein first examples in the training dataset are labeled using a first label that indicates a respective first example is AI-generated, second examples are labeled using a second label that indicates a respective example is not AI-generated, and third examples are labeled using a third label that identifies a respective source of a particular generative AI model from a plurality of generative AI models that generated a respective third example;
generate a subset of the training dataset for a first source of a generative AI model from the third examples, wherein the subset of the training dataset includes a first subset of the third examples that is labeled with the third label for the first source of the generative AI model and a second subset of the third examples that is labeled with one or more sources other than the first source, wherein the second subset of the third examples is relabeled with a fourth label of not generated by the first source;
train parameters of AI-generated content classifiers in the set of AI-generated content classifiers based on learning correlations between features that distinguish between human-created content and artifacts associated with generative AI models in examples in a training dataset and a particular label, wherein a first AI-generated content classifier of the AI-generated content classifiers comprises a plurality of sub-classifiers that are associated with a respective generative AI model and trained using the third examples, and wherein a specific sub-classifier of the plurality of sub-classifiers for the first source of a generative AI model of the plurality of generative AI models is trained using the subset of the training dataset to learn correlations for features that are specialized to the first source of the generative AI model of the plurality of generative AI models based on the first subset of the third examples with the third label being positive examples of being AI generated by the first source of the generative AI model of the plurality of generative AI models and the second subset of the third examples with the fourth label being negative examples of not generated by the first source;
receive a classification request specifying query content;
execute the first AI-generated content classifier on the query content to compute a first set of confidence scores proportional to predicted probabilities that the query content includes content data produced by a generative AI model, wherein the first set of confidence scores is generated based on parameters learned by the first AI-generated content classifier during training, wherein a sub-classifier in the plurality of sub-classifiers outputs a sub-confidence score proportional to a probability that the query content includes content data produced by a respective generative AI model for the sub-classifier; and
output classification results that indicate whether the query content is AI-generated based on the first set of confidence scores and indicate whether the query content is generated by a particular generative AI model based on one or more of the sub-confidence scores output by the plurality of sub-classifiers.

2. The computing system of claim 1, wherein execute the first AI-generated content classifier on the query content further comprises:
generate an embedding representation based on parameters learned by the first AI-generated content classifier during the training, wherein the embedding representation encodes features of the query content in an embedding space;
derive a set of correlations between the embedding representation and embedding representations of labeled training examples analyzed by the first AI-generated content classifier during the training; and
weight and normalize the set of correlations to compute the first set of confidence scores.

3. The computing system of claim 1, wherein the set of AI-generated content classifiers includes two or more of an AI-generated text classifier, an AI-generated image classifier, an AI-generated audio classifier, or an AI-generated video classifier.

4. The computing system of claim 1, wherein the first AI-generated content classifier is an AI-generated text classifier, and wherein executing the instructions further cause the computing system to:
split query text into segments; and
generate a confidence score for each segment, wherein a confidence score in the set of confidence scores is based on the confidence score for at least one segment.

5. The computing system of claim 4, wherein the first set of confidence scores includes both segment level confidence scores and an overall confidence score proportional to a probability the query text is based on AI-generated text.

6. The computing system of claim 1, wherein the query content comprises a query video, and wherein executing the instructions further cause the computing system to:
route the query video to an AI-generated image classifier and an AI-generated audio classifier;
split query video into representative frames and execute the AI-generated image classifier on each frame to generate a first result; and
execute the AI-generated audio classifier on the query video to generate a second result, wherein the first set of confidence scores is based on the first result and the second result.

7. The computing system of claim 6, wherein the first result and the second result include one or more of frame-by-frame scores, an audio score, and an overall confidence score computed from audio scores and frame scores.

8. The computing system of claim 1, wherein:
a third label that identifies a respective source of a particle generative AI model for the third label is determined from an output from a respective generative AI model.

9. The computing system of claim 1, wherein executing the instructions further cause the computing system to:
combine the sub-confidence scores into an overall confidence score proportional to an overall probability that the query content includes content data produced by any particular generative AI model.

10. The computing system of claim 1, wherein executing the instructions further cause the computing system to:
output the sub-confidence scores from the sub-classifiers and the classification results from the set of confidence scores from the first AI-generated content classifier.

11. The computing system of claim 1, further comprising:
a communication interface, wherein:
a client device is a remote third-party server system; and
the communication interface comprises an application programming interface configured to: receive the classification request as an application programming interface (API) call referencing query content hosted on the third-party server system; output classification results including the set of confidence scores to the third-party server system-.

12. The computing system of claim 1, wherein:
training data is generated by an AI-generative model,
the training data is augmented based on techniques to mask that the training data is generated by the AI-generative model, and
the set of AI-generated content classifiers are trained on the training data that is augmented.

13. The computing system of claim 1, wherein the correlations are between features that distinguish between human-created content and artifacts leftover from de-noising processes of diffusion models.

14. The computing system of claim 1, further comprising:
identify a plurality of content types for the query content;
route a first portion of query content to a first AI-generated content classifier in the set of AI-generated content classifiers based on a first content type in the plurality of content types;
route a second portion of the query content to a second AI-generated content classifier in the set of AI-generated content classifiers based on a second content type in the plurality of content types;
execute the second AI-generated content classifier on the second portion of the query content to compute a second set of confidence scores proportional to predicted probabilities that the second portion of the query content includes content data produced by a generative AI model, wherein the second set of confidence scores is generated based on parameters learned by the second AI-generated content classifier during training for the second content type.

15. The computing system of claim 14, wherein:
a third AI-generated content classifier is associated with a third content type, and
the query content is routed to the first AI-generated content classifier and the second AI-generated content classifier based on the query content being associated with the first content type and the second content type, respectively, and not routed to the third AI-generated content classifier.

16. The computing system of claim 15, wherein the first AI-generated content classifier, the second AI-generated content classifier, and the third AI-generated content classifier include an AI-generated text classifier, an AI-generated image classifier, and an AI-generated audio classifier.

17. The computing system of claim 14, further comprising:
training the parameters of the first AI-generated content classifier on a first training set for the first content type; and
training the parameters of the second AI-generated content classifier on a second training set for the second content type, the first training set including different content from the second training set.

18. A non-transitory computer-readable storage medium having stored thereon computer executable instructions, which when executed by a computing device, cause the computing device to be operable for:
aggregate a training dataset that includes examples, wherein first examples in the training dataset are labeled using a first label that indicates a respective first example is AI-generated, second examples are labeled using a second label that indicates a respective example is not AI-generated, and third examples are labeled using a third label that identifies a respective source of a particular generative AI model from a plurality of generative AI models that generated a respective third example;
generate a subset of the training dataset for a first source of a generative AI model from the third examples, wherein the subset of the training dataset includes a first subset of the third examples that is labeled with the third label for the first source of the generative AI model and a second subset of the third examples that is labeled with one or more sources other than the first source, wherein the second subset of the third examples is relabeled with a fourth label of not generated by the first source;
train parameters of AI-generated content classifiers in the set of AI-generated content classifiers based on learning correlations between features that distinguish between human-created content and artifacts associated with generative AI models in examples in a training dataset and a particular label, wherein a first AI-generated content classifier of the AI-generated content classifiers comprises a plurality of sub-classifiers that are associated with a respective generative AI model and trained using the third examples, and wherein a specific sub-classifier of the plurality of sub-classifiers for the first source of a generative AI model of the plurality of generative AI models is trained using the subset of the training dataset to learn correlations for features that are specialized to the first source of the generative AI model of the plurality of generative AI models based on the first subset of the third examples with the third label being positive examples of being AI generated by the first source of the generative AI model of the plurality of generative AI models and the second subset of the third examples with the fourth label being negative examples of not generated by the first source;
receive a classification request specifying query content;
execute the first AI-generated content classifier on the query content to compute a first set of confidence scores proportional to predicted probabilities that the query content includes content data produced by a generative AI model, wherein the first set of confidence scores is generated based on parameters learned by the first AI-generated content classifier during training, wherein a sub-classifier in the plurality of sub-classifiers outputs a sub-confidence score proportional to a probability that the query content includes content data produced by a respective generative AI model for the sub-classifier; and
output classification results that indicate whether the query content is AI-generated based on the first set of confidence scores and indicate whether the query content is generated by a particular generative AI model based on one or more of the sub-confidence scores output by the plurality of sub-classifiers.

19. A method comprising:
aggregating a training dataset that includes examples, wherein first examples in the training dataset are labeled using a first label that indicates a respective first example is AI-generated, second examples are labeled using a second label that indicates a respective example is not AI-generated, and third examples are labeled using a third label that identifies a respective source of a particular generative AI model from a plurality of generative AI models that generated a respective third example;
generating a subset of the training dataset for a first source of a generative AI model from the third examples, wherein the subset of the training dataset includes a first subset of the third examples that is labeled with the third label for the first source of the generative AI model and a second subset of the third examples that is labeled with one or more sources other than the first source, wherein the second subset of the third examples is relabeled with a fourth label of not generated by the first source;
training parameters of AI-generated content classifiers in the set of AI-generated content classifiers based on learning correlations between features that distinguish between human-created content and artifacts associated with generative AI models in examples in a training dataset and a particular label, wherein a first AI-generated content classifier of the AI-generated content classifiers comprises a plurality of sub-classifiers that are associated with a respective generative AI model and trained using the third examples, and wherein a specific sub-classifier of the plurality of sub-classifiers for the first source of a generative AI model of the plurality of generative AI models is trained using the subset of the training dataset to learn correlations for features that are specialized to the first source of the generative AI model of the plurality of generative AI models based on the first subset of the third examples with the third label being positive examples of being AI generated by the first source of the generative AI model of the plurality of generative AI models and the second subset of the third examples with the fourth label being negative examples of not generated by the first source;

receiving a classification request specifying query content;

executing the first AI-generated content classifier on the query content to compute a first set of confidence scores proportional to predicted probabilities that the query content includes content data produced by a generative AI model, wherein the first set of confidence scores is generated based on parameters learned by the first AI-generated content classifier during training, wherein a sub-classifier in the plurality of sub-classifiers outputs a sub-confidence score proportional to a probability that the query content includes content data produced by a respective generative AI model for the sub-classifier; and outputting classification results that indicate whether the query content is AI-generated based on the first set of confidence scores and indicate whether the query content is generated by a particular generative AI model based on one or more of the sub-confidence scores output by the plurality of sub-classifiers.

20. The method of claim 19, wherein executing the first AI-generated content classifier on the query content further comprises:

generating an embedding representation based on parameters learned by the first AI-generated content classifier during the training-stage, wherein the embedding representation encodes features of the query content in an embedding space;

deriving a set of correlations between the embedding representation and embedding representations of labeled training examples analyzed by the first AI-generated content classifier during the training stage; and weighting and normalizing the set of correlations to compute the first set of confidence scores.

21. The method of claim 19, further comprising:

identify a plurality of content types for the query content;

route a first portion of query content to a first AI-generated content classifier in the set of AI-generated content classifiers based on a first content type in the plurality of content types;

route a second portion of the query content to a second AI-generated content classifier in the set of AI-generated content classifiers based on a second content type in the plurality of content types;

execute the second AI-generated content classifier on the second portion of the query content to compute a second set of confidence scores proportional to predicted probabilities that the second portion of the query content includes content data produced by a generative AI model, wherein the second set of confidence scores is generated based on parameters learned by the second AI-generated content classifier during training for the second content type.

22. The method of claim 21, wherein:

a third AI-generated content classifier is associated with a third content type, and the query content is routed to the first AI-generated content classifier and the second AI-generated content classifier based on the query content being associated with the first content type and the second content type, respectively, and not routed to the third AI-generated content classifier.

* * * * *